Fig. 2.

Dec. 12, 1944.    R. T. POLLOCK ET AL    2,364,654
POWER CONTROL APPARATUS
Filed July 24, 1942    7 Sheets-Sheet 6

INVENTOR
ROBERT T. POLLOCK
OTTO C. W. HENZE
BY
ATTORNEY

Patented Dec. 12, 1944

2,364,654

UNITED STATES PATENT OFFICE 2,364,654

POWER CONTROL APPARATUS

Robert Thomas Pollock and Otto C. W. Henze, New York, N. Y., assignors to Joseph Lee Sweeney, New York, N. Y.

Application July 24, 1942, Serial No. 452,130

11 Claims. (Cl. 197—84)

This invention relates to power control apparatus and more particularly to improvements in the power control mechanism disclosed in our application Serial No. 429,886, filed February 7, 1942.

In our pending application, above specified, there is disclosed and claimed an escapement mechanism of general application, with special reference to its use in typewriting machines, and it shows a fixed lock acting at one point on the line of escapement control, a differential gear mechanism at another point on the line of escapement control, and a second fixed lock acting upon one of the elements of said differential gear mechanism. In operation the first lock is brought into action, the second lock released, the coordination of parts changed to an adjustably predetermined extent, whereupon the second lock is again locked, the first lock released, and the carriage allowed to travel a distance the extent of which is predetermined and easily adjustable.

One of the objects of the present invention is to improve the former mechanism by eliminating the somewhat complicated differential gear mechanism with its added cost and other possible disadvantages as compared with the simplified structure of the present invention.

Another object of the present invention is to utilize in a power control apparatus, a fixed lock and a swinging lock, each of the frictional type and having the general characteristics of efficiency, durability, ease and quickness of action, plus the special advantage of being operable in such a way that the number of gradations of movement is virtually limitless within any predetermined range.

The frictional type of lock here shown in each instance is the ball clutch mechanism disclosed and claimed in our application Serial No. 429,887, filed February 7, 1942.

Still another object of the present invention is to provide directly upon the control shaft of an escapement mechanism such as that under consideration, a disk acted upon at one point by a fixed locking device of the frictional type and at another point by a swinging lock of the frictional type. The escapement is controlled through these two frictional locks, thereby resulting in economy of parts, simplicity of construction, increased certainty of action, and durability.

Another object of the invention is to provide a means for the control of a power actuated mechanism so simple in construction, direct, positive, and instantaneous in the action of its various parts that it may be used with efficiency and certainty in a large number of different associations wherein it is desired to control with precision the timing, or extent, of the operation of such power actuated mechanism.

The invention accordingly comprises the features of construction, combinations of elements, and arrangement of parts, which will be exemplified in the constructions hereinafter set forth, and the scope of the application of which will be indicated in the claims.

For a fuller understanding of the nature and objects of the invention, reference should be had to the following detailed description taken in connection with the accompanying drawings, in which.

Figures 1, 11:
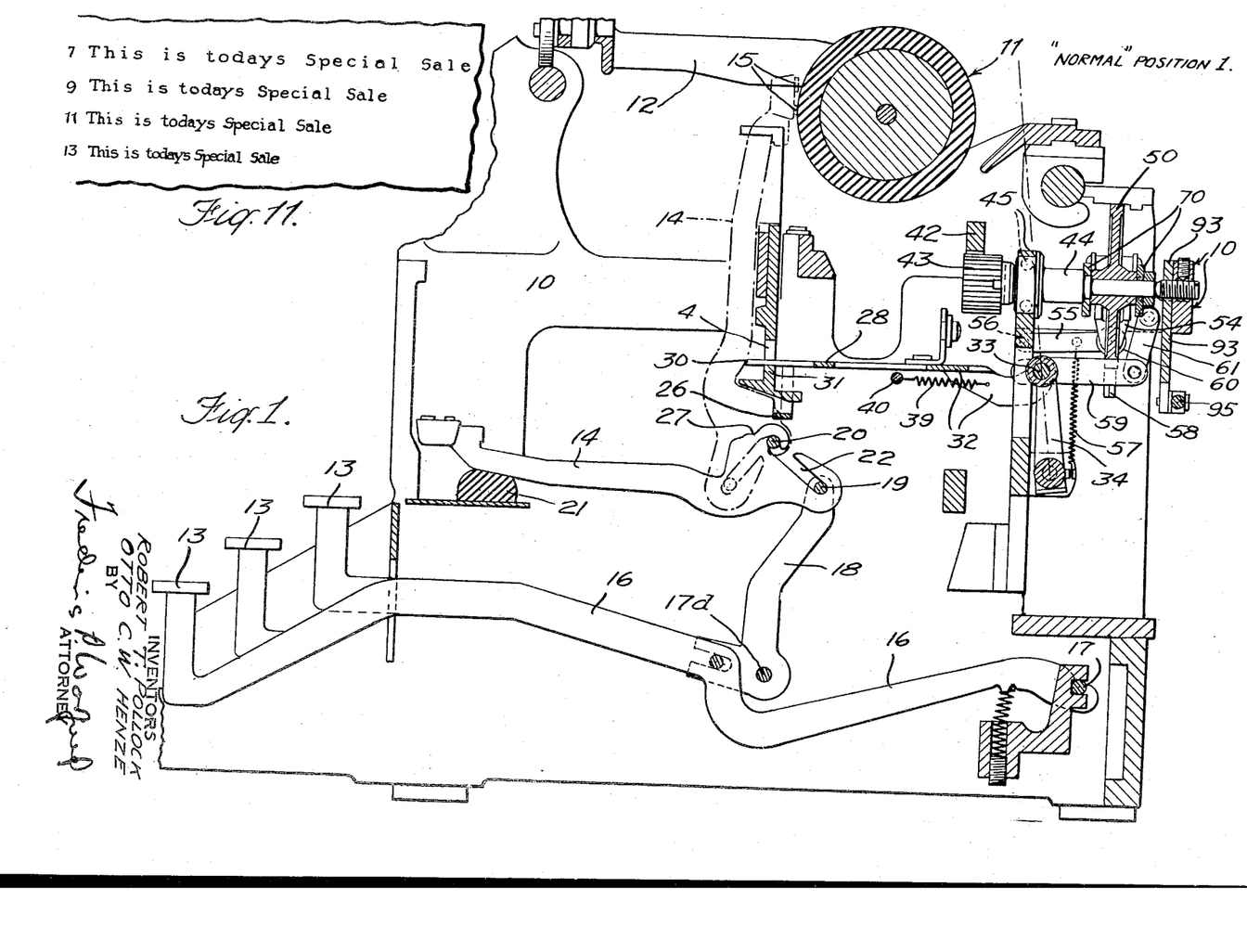
Figure 1 is a view, partly in section and partly in side elevation of a typewriting machine, taken at substantially the center of the machine where the types strike against the platen, and showing the present invention applied to the control of the mechanism which governs the carriage travel.
Figure 11 is a sample of the typing which can be done on a typewriting machine having an escapement mechanism control as shown in the various figures.

Referring now to Figure 1, a typewriting machine is shown having a frame consisting of numerous parts, all of which are stationary. Wherever such parts are shown they have been designated by the reference character 10. A platen 11 is shown mounted on a carriage 12 which is slideably mounted for longitudinal movement in the frame 10 in a conventional manner. A plurality of keys 13 are operatively connected to type bars 14 which carry types 15, the levers being so arranged that the type will strike against the platen 11 when the keys are depressed. In the drawings, the ribbon and paper have been omitted, but it will be understood that the paper is wrapped around the platen, and the inking ribbon, if this form of inking mechanism is used, is in front of the paper and is struck by the types when the machine is operated to print the characters on the paper.

As shown in Fig. 1, the keys 13 are mounted on key levers 16 which are pivoted at 17 to a portion of the frame 10. Upwardly extending arms 18 are pivoted at 17d and have pins 19 at the upper ends thereof. The type bars 14 are pivoted at 20 and normally lie in a horizontal position resting against a suitable cushion 21. Each type bar extends beyond its pivot 20 and is provided with a slot 22 which extends at an angle to the bar and engages the pin 19 on the end of the associated arm 18, the pin 19 resting normally against the lowermost end of the slot. The arrangement is such that when a key 13 is depressed, the key lever 16 rotates around the pivot 17, thus swinging the arm 18 towards the front of the machine, whereupon the pin 19 causes the type bar 14 to swing up about its pivot 20, the pin 19 sliding in the slot 22 as the type bar moves.

The escapement mechanism is operated by a bail 26 which is moved by cam surfaces 27 formed on the type bars 14 adjacent the pivot 20. The arrangement is such that the type bar moves about ⅘ of its travel before the cam 27 strikes the bail 26. The bail 26, in the particular typewriter selected for disclosing the invention, is a bar curved to conform with the configuration of the type bars which are mounted in a fan-shaped arrangement. The bail 26 is secured to a plate 28 which lies horizontally in the machine and is mounted for backward and forward movement. The plate 28 is suitably cut out to reduce the weight, and its forward end is provided with an extension 30 which slides in a suitable slot 31 in the frame 10. The rear end of the plate 28 is provided at the sides thereof with two arms 32 which are pivotally connected to a rod 33 which is mounted on the upper ends of the arms 34 of a vertically positioned yoke member 36. The main portion of the yoke 36 is pivotally connected in the frame 10 by suitable pivots 83. The yoke 36 supports the rear end of the plate 28 and permits the plate to move backwards and forwards in the machine as the yoke rotates about its pivots 83.

The movement of the yoke 36 is caused to operate the escapement mechanism in a manner to be hereinafter described. A spring 39 (Fig. 1) connected between a portion of the plate 28 and a pin 40 on the frame 10 urges the plate 28 in a forward direction at all times, and the plate is prevented from moving too far forward by the bail 26 which engages a suitable stop 4 on the frame 10.

The carriage 12 is provided with a rack 42 which extends from side to side of the machine and moves as the carriage moves.

Thus far, the assembly of the parts is the same as that in our pending application, Ser. No. 429,886, above referred to.

As shown herein, the rack 42 meshes with pinion 43 mounted on a shaft 44 which has suitable bearings 45 on the frame 10. Directly mounted upon this shaft, as keyed or otherwise connected thereto and rotating therewith, is control disk 50, which thus moves with the movement of the typewriter carriage, and, when restricted against rotation, prevents movement of the typewriter carriage. This disk is circular and of dimensions and size to insure its durability in use and has plane faces on each of its two sides, at least to such an extent as to provide smooth working areas against which the balls of the two controlling ball clutches may operate. These plane side faces need only be such in their relations to the balls and the other members of the ball clutches as to provide areas around the faces of the disk so that said ball clutches may operate with a frictional locking action at any point around said disk.

There are two of these ball clutches, one of which is fixed in position and one of which has a swinging or pendulum movement. It follows that the control disk 50 may be gripped and held at any point in its rotation, and there are, accordingly, an infinite number of possible variations of the extent of its rotation. The operation of this control disk is, accordingly, radically differentiated from the operation of an escapement wheel, the control of which is dependent upon the movement of the wheel through a position from one tooth of the escapement wheel to another tooth in such escapement wheel, the movement being accordingly proportional to the distance from one tooth to the next or multiples thereof.

Figure 2:
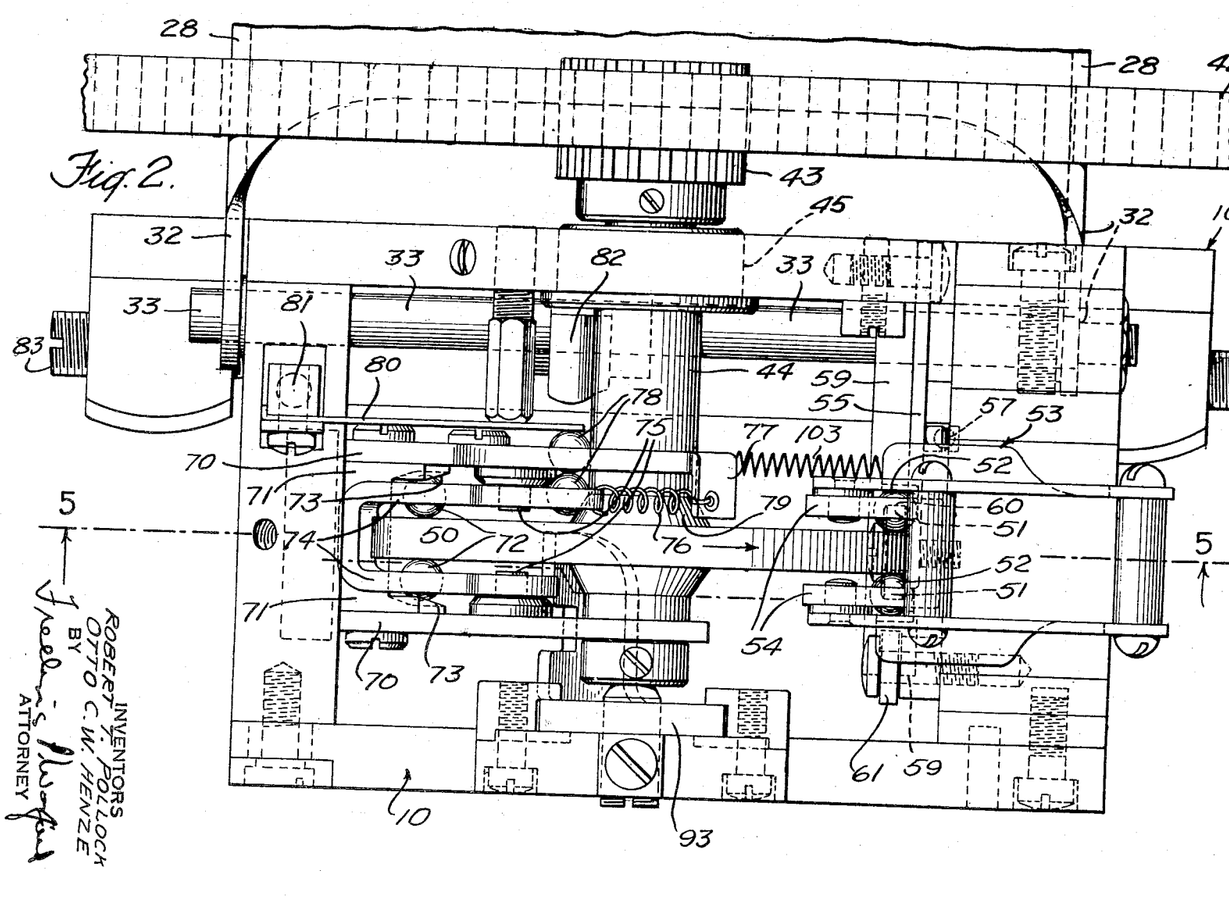
Figure 2 is a top plan view showing a part of the carriage rack, with its associated pinion, and the control disk on the shaft of said pinion with the two ball clutches acting thereon.
Figures 6, 7, 8:
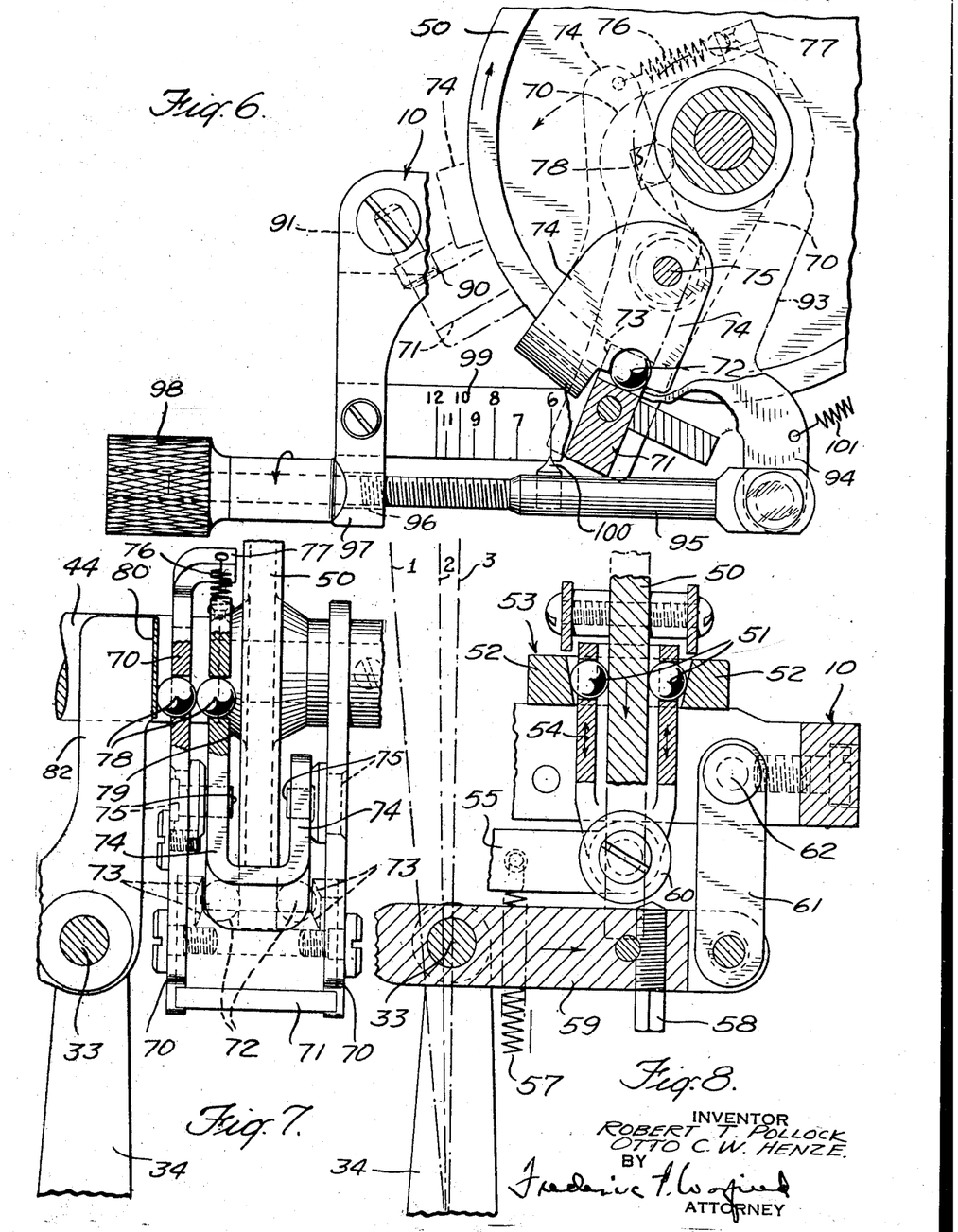
Figure 6 is a detail view, partly in elevation, and partly in section showing the means for operating the adjustable stop which limits the extent of movement of the swinging member carrying the swinging ball clutch around the side faces of the control disk.
Figure 7 is a detail partly in section and partly in top plan of the swinging ball clutch.
Figure 8 is a detail partly in section and partly in elevation showing the construction and control of the fixed ball clutch.

As shown at the right of Figure 2 and in detail in Figure 8, we provide a ball lock which is fixed with reference to the axis of the control disk 50. The movable parts thereof are only such as to permit the balls 51 which constitute the locking members thereof to move into and out of locking engagement with the control disk 50.

We come now to the details of the fixed ball lock. As shown in detail in Fig. 8, locking balls 51 are positioned on each side of the control disk 50 near the outer edges thereof, these balls being mounted for movement to and from locking position between the plane side faces of the disk and wedge faces 52 formed on the inner sides of ball yoke 53 suitably fixed to the frame and held in position with reference to the control disk. These balls are loosely held in apertures on the upper ends of ball yoke 54. The relation between the diameter of the balls and the size of the apertures in the ball yoke 53 is such as to give freedom of rotation to the balls but a minimum of lost motion. Ball yoke 54 is mounted for vertical movement at the end of lever 55 pivoted at 56 and normally urged downwardly by spring 57 connected to any fixed point on the frame. Under the influence of this spring, the ball yoke 54 brings the balls downwardly as shown in Fig. 8 and by jamming them between the control disk and the wedge faces 52 locks the control disk and prevents its rotation. This locking action is released and the control disk released so far as this lock is concerned, by raising the ball yoke 53 through the action of a cone point screw 58, which contacts with roller 60 on the lower end of ball yoke 54 when the link 59 on which said cone point screw is mounted is moved into position under the roller. Link 59 is connected at one end to rod 33 so as to move with the sliding plate 28. Its other end is suspended from the frame through the medium of a connecting link 61, pivotally supported at its upper end as by pivot 62 and pivotally connected at its lower end to the link 59.

We come now to the swinging ball clutch shown in top plan of Fig. 2 and in detail in other figures of the drawings. This swinging ball clutch comprises a main outside stirrup-like frame having side members 70 and connecting cross member 71. The side members 70 are pivotally mounted at their inner ends upon the main shaft 44 so that this frame can revolve thereabout with a swinging or pendulum movement with reference to the shaft and the main control disk 50. The locking balls 72 of this swinging ball clutch are shown as positioned between plane side faces of the control disk 50 and wedge faces 73 formed on the cross member 71. As shown in detail in Fig. 9 these balls are mounted loosely for rotation but with a minimum amount of lost motion in apertures in the ends of the arms 74 of a second inner stirrup member which carries the balls to and from locking position by movement around its pivot members 75 carried from the inner surfaces of the main stirrup arms 70. These balls are normally held in locking position under the influence of a spring 76 between the upper end of the arm of the inner stirrup and a fixed point 77 on the outer stirrup arm 70.

Figure 9:
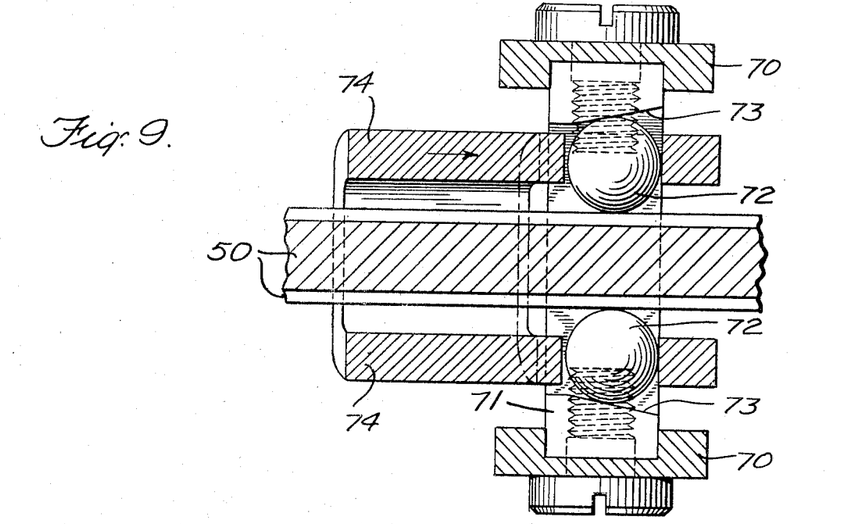
Figure 9 is an enlarged sectional detail showing the relation of the locking balls of the swinging ball clutch to the control disk.
Figure 10:
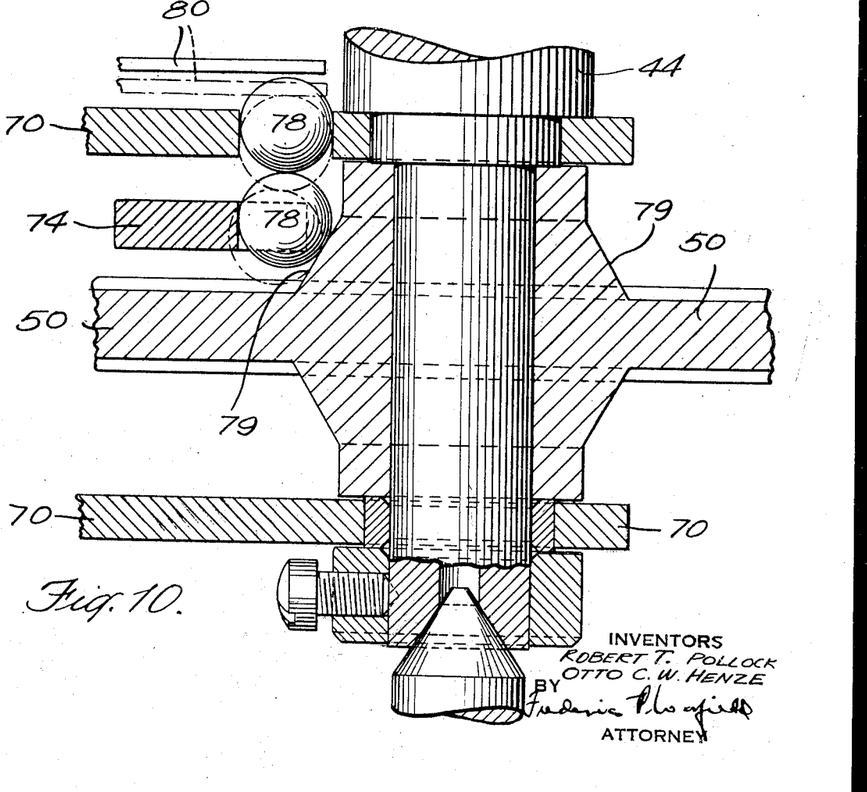
Figure 10 is a sectional detail showing releasing balls interposed in the line of action to release the locking action of the balls of the swinging ball clutch.

These balls are moved away from locking position with reference to the control disk by the action of releasing balls 78 shown in detail in Fig. 10. When these releasing balls are in a straight line position parallel to the shaft axis, the balls 72 are locked to the control disk. When they are moved to the dotted line position shown in Fig. 10 they are forced against a wedge surface 79 on the hub of the main control disk 50 and the stirrup arm 74 so that the said stirrup will carry the balls 72 into non-locking position. These releasing balls are controlled as to position by a spring member 80 suitably mounted on the frame as at 81 and adapted to be contacted with by a goose-neck extension 82 on and mounting with the main actuating member 28. When this spring under the influence of this goose-neck extension is moved to the position shown in dotted lines in Fig. 10, it carries the releasing balls with it, forces the stirrup to the left as shown in Fig. 10 and to the right as shown in Fig. 9, and releases the swinging lock.

We pass now to the means for adjusting the swinging or pendulum movement of the swinging ball lock which determines the amount of travel of the control disk and accordingly the travel of the typewriter carriage under the actuation of its tension spring 89. The main stirrup 70 carrying the swinging lock about the axis of the control disk is arranged for movement, as shown in detail in Fig. 5, between a fixed stop provided by a screw 90 threaded into the fixed main frame of the machine at 91 and an adjustable stop 92 supplied by the face of a member 93 pivoted to move about the center of the axis of the main shaft. While we speak of these stops above as fixed and adjustable, it is noted that under certain conditions one or both of these stops may be provided with an adjustable control. The screw 90 in itself, of course, provides a certain species of adjustment since it may be threaded into and out of the frame. The pivotal adjustment of the adjustable stop is controlled, as best shown in detail in Fig. 6, through its pivotal connection at its lower end at 94 to a rod 95 threaded through an aperture 96 in a part 97 fixed to the main frame and operable by a knurled handle 98. Along the side of this adjusting rod extends a scale 99 duly marked off as shown to indicate the extent of movement given to the adjustable stop by the turning of the knurled handle. A pointer 100 on rod 95 moves along this scale. A spring 101 duly connected between the swinging adjustable stop arm 93 and a fixed point on the frame tends to urge said adjustable stop to one limit of its movement away from the fixed stop.

Figure 5:
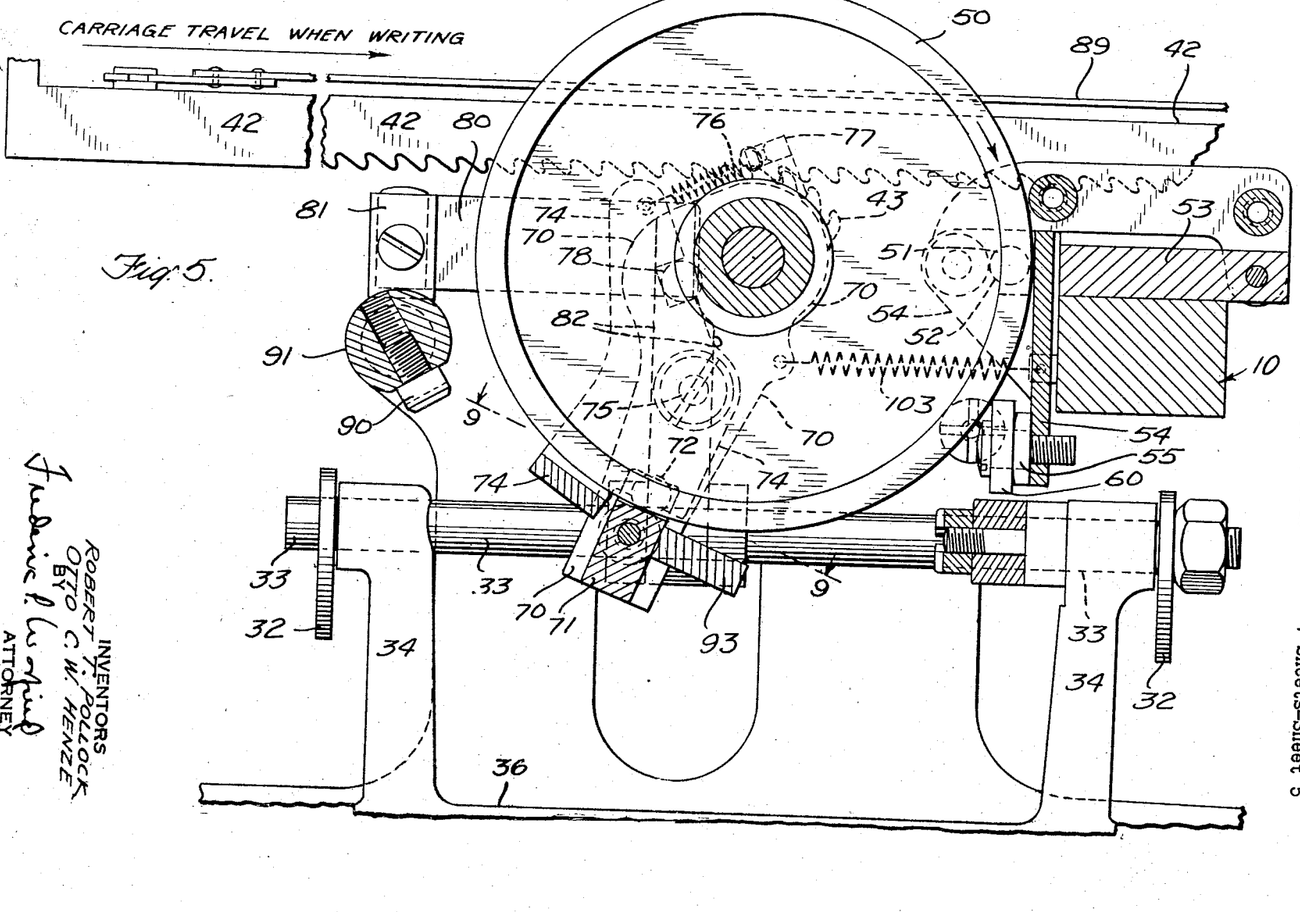
Figure 5 is a detail view, partly in section and partly in elevation taken on the line 5—5 of Fig. 2 and looking in the direction of the arrows as indicated on Fig. 2.

A spring 103 has one of its ends fixed to the frame 10 and its opposite end connected to the stirrup 70 for moving the latter counter-clockwise (Fig. 5).

Figure 3:
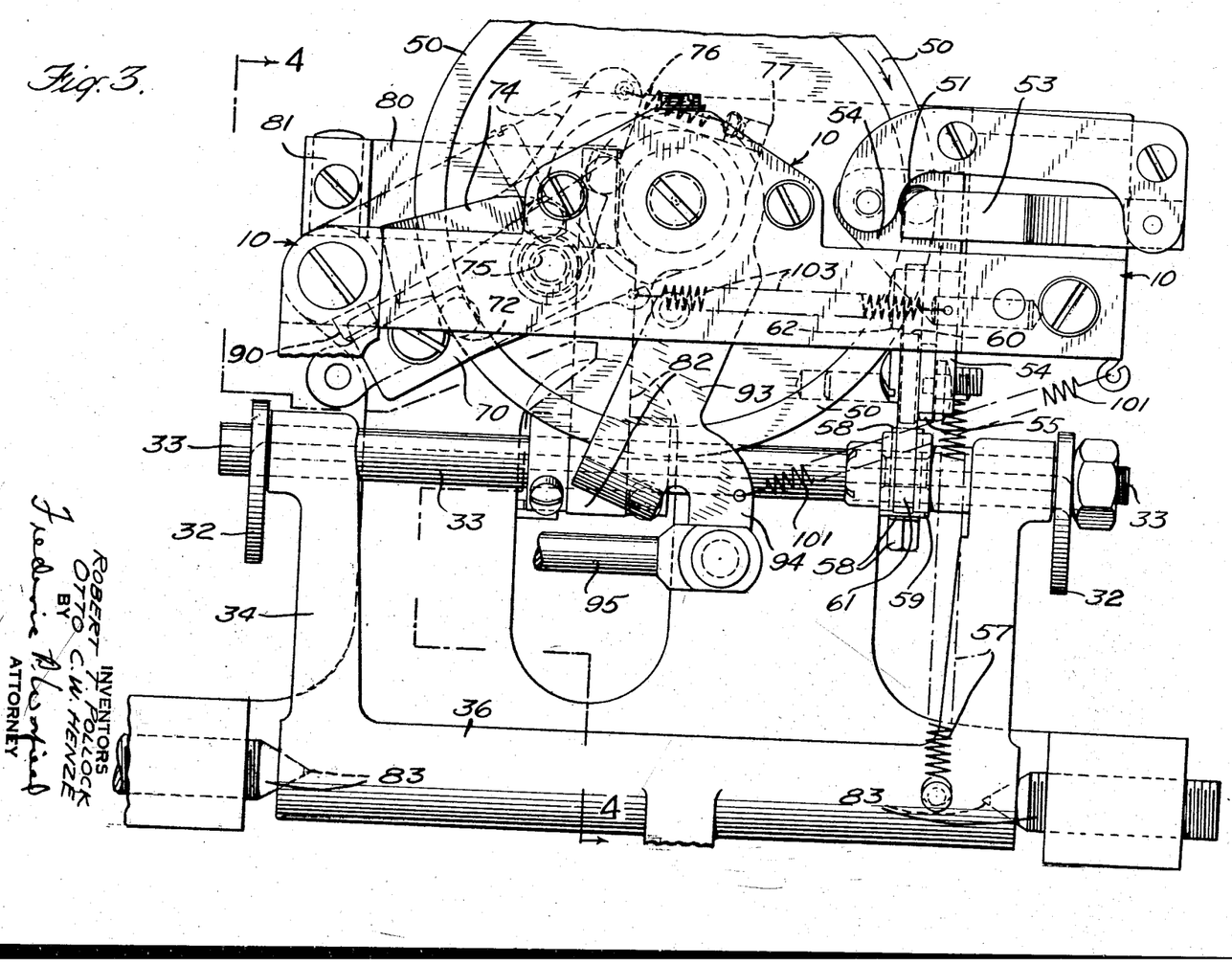
Figure 3 is a rear elevation, certain parts being cut away or omitted, to illustrate the action of the two ball clutches upon the control disk.
Figure 4:
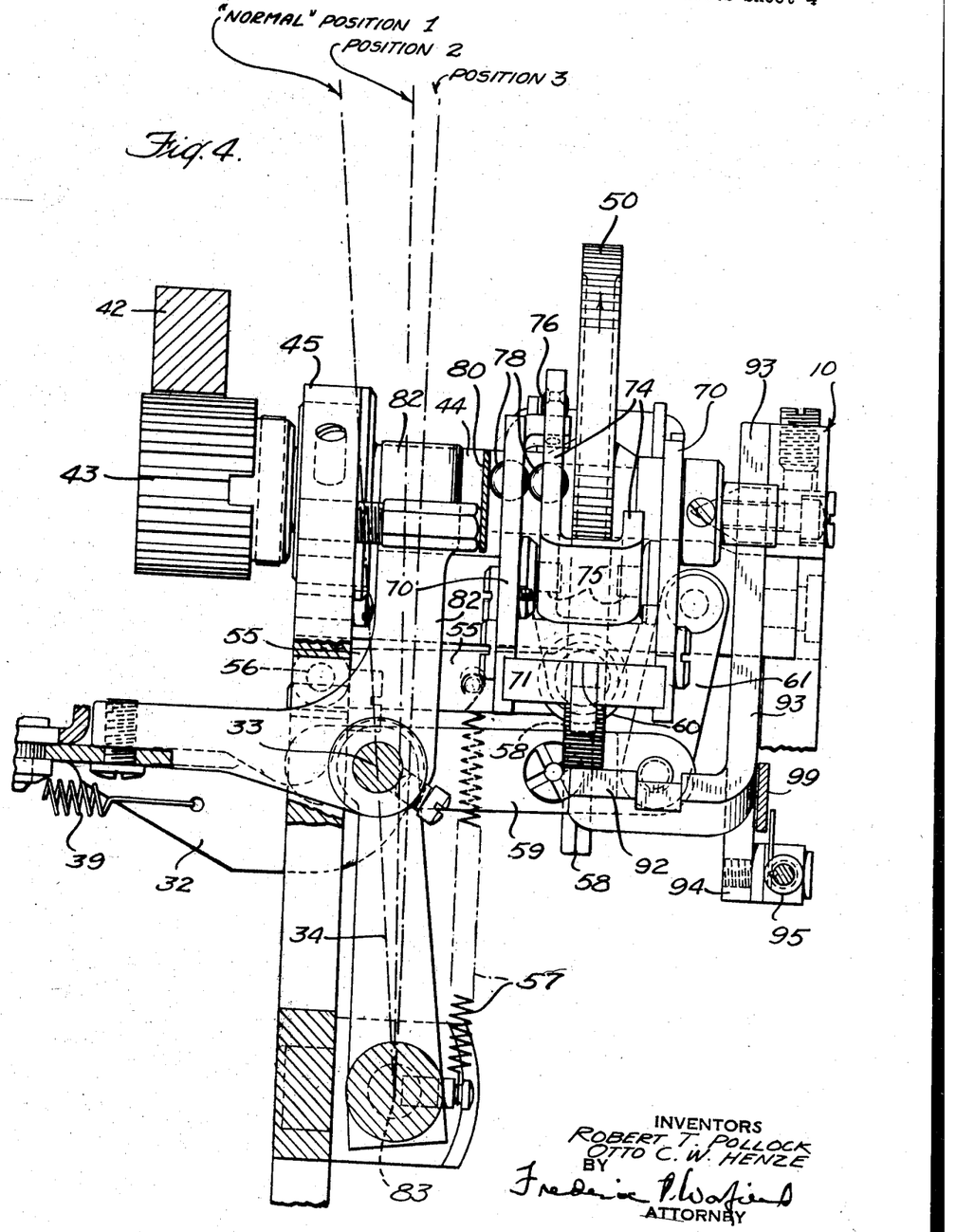
Figure 4 is a detail view, partly in section and partly in elevation taken on the line 4—4 of Fig. 3 and looking in the direction of the arrows as indicated on Fig. 3.

The operation and timing of the parts may now be followed through. Upon depression of a key there will be no action of the escapement mechanism until the type bar has almost reached the limit of its movement up to printing position. However, during the final movement of the type bar to printing position, the cam 27 acts upon the bail 26 and carries rearward the plate 28, which travels with the bail. This movement first by carrying rearward the link 59 moves the cone point screw 58 out from under the roller 60 of the fixed lock and locks the disk against movement in a clockwise direction (Fig. 5) through the action of the balls 52 of this fixed lock. Just at the point when this fixed lock is brought into action, the goose-neck extension 82 carried by the plate 28 moves the releasing balls 78 of the swinging ball lock in, and, through the described connection, forces the balls of the swinging ball lock out of locking engagement with the control disk. The stirrup carrying the parts of the swinging ball lock is normally in the position, shown in full lines in Fig. 3, and indicated in part in dotted lines in Fig. 6, against the fixed stop 90. When released, however, by the action of the release balls, this swinging lock will be carried in counterclockwise direction, as shown in Figs. 3 and 6, under the action of spring 103 until it comes into position against the face 92 of the adjustable stop 93. When pressure upon the typewriter key is released, the pressure upon the balls 78 through the spring 80 is released, and the spring 76 then again carries the stirrup arm with the balls 72 into locking position with reference to the control disk. At this time by the movement of the link 59, the cone point screw 58 is returned to position beneath the roller 60 and the balls of the fixed lock carried out of locking position. The fixed lock is then released from the control disk and the swinging lock is in operation, locked against the control disk so it will travel with the latter. The control disk is then free to rotate and under the influence of the carriage return spring (not shown) which is stronger than spring 103, the typewriter carriage will move, the control disk moving with it, until the swinging lock which is closed upon the control disk strikes against the fixed stop 90. Thus the cycle is complete and the carriage has been moved to an amount determined by the distance between the predetermined position of the adjustable stop and the fixed stop, the control disk being allowed an arc of rotation thus predetermined and limited.

It will thus be seen that the present invention fulfills the objects as set forth above most efficiently and provides for the control of a power actuated member, as to timing or extent, by controlling the movement of a control disk suitably connected so that it must move with the power actuated member. This control of the control disk is by means of a fixed ball lock and a swinging ball lock directly associated with the control disk, providing a minimum of parts and utilizing in such power control, to the full, the advantages of the ball clutch set forth in our pending application above noted.

Since certain changes may be made in the above construction and different embodiments of the invention could be made without departing from the scope thereof, it is intended that all matter contained in the above description as shown in the accompanying drawings shall be interpreted as illustrative and not in a limiting sense.

It is also to be understood that the following claims are intended to cover all of the generic and specific features of the invention herein described, and all statments of the scope of the invention which as a matter of language might be said to fall therebetween.

Having described our invention what we claim as new and desire to secure by Letters Patent is:

1. In a control device for a power actuated moving member, a shaft operatively connected to the moving member so that movement of said member must be accompanied by a rotation of said shaft, a control disk having a plane side operating area carried by said shaft and rotating therewith, a clutch fixed in position with reference to said control disk but operable into and out of locking position with relation to the plane side operating area thereof, a second clutch mounted for swinging movement around said disk and mounted for movement to and from locking position with reference to the plane side operating area of said disk, stops between which said swinging clutch operates, one of said stops being adjustable and means for operating each of said clutches so that the fixed clutch may hold the control disk when the swinging clutch is free.

2. In a control device for a power actuated moving member, a shaft operatively connected to the moving member so that movement of said member must be accompanied by rotation of said shaft, a control disk carried by said shaft and rotating therewith, said control disk having a smooth operating area, a frictional clutch fixed in position with reference to said control disk but operable into and out of locking position with relation to the smooth operating area thereof, a second frictional clutch mounted for swinging movement around said disk and mounted for movement to and from locking position with reference to the smooth operating area of the said disk, stops between which said swinging frictional clutch operates, one of said stops being adjustable, and means for operating each of said frictional clutches so that the fixed frictional clutch may hold the control disk when the swinging frictional clutch is free.

3. In a control device for a power actuated moving member, a shaft operatively connected to the moving member so that movement of said member must be accompanied by a rotation of said shaft, a control disk having plane side operating areas carried by said shaft and rotating therewith, a frictional lock fixed in position with reference to said control disk but operable into and out of locking position with relation to a plane side operating area thereon, a second frictional lock operable also upon a plane side operating area of said disk and mounted for swinging movement around said disk, stops between which said swinging lock operates, one of said stops being adjustable, and means for operating each of said locks so that the fixed lock may hold the control disk when the swinging lock is free.

4. In a control device for a power actuated moving member, a shaft operatively connected to the moving member so that movement of said member must be accompanied by a rotation of said shaft, a control disk having plane side operating areas carried by said shaft and rotating therewith, a ball clutch fixed in position with reference to said control disk but operable into and out of locking position with relation thereto, a second ball clutch mounted for swinging movement around said disk and having a ball mounted for movement to and from locking position with reference to said disk, stops between which said swinging clutch operates, one of said stops being adjustable, and means for operating each of said clutches so that the fixed clutch may hold the control disk when the swinging clutch is free.

5. In a control device for a power actuated moving member, a shaft operatively connected to the moving member so that movement of said member must be accompanied by a rotation of said shaft, a disk having plane side operating areas carried by said shaft and moving therewith, a fixed ball clutch acting against a plane area face of said disk, a ball clutch mounted for pendulum movement around the face of said disk, and operating against a plane area thereof, said swinging clutch being normally locked to said disk, and means for controlling the action of the parts, resulting in timing thereof in such order as to result in locking said fixed clutch against the disk, releasing the swinging clutch and allowing it to swing through an adjustably predetermined arc, locking it again to the disk, then releasing the fixed clutch, whereby the disk is allowed to move through an adjustably predetermined arc, and the power actuated member is released for a movement thereby controlled.

6. In combination a control disk, a shaft with which it rotates, a ball clutch lock acting on a face of said control disk and fixed with reference to its axis, a ball clutch lock mounted for swinging movement about the axis of said disk and operable to clutch and hold said control disk at any point during the arc of its movement, stops, one of which is adjustable, determining the extent of movement of the swinging ball clutch, and means for operating the clutches in such sequence that the fixed clutch locks the disk against movement in one direction while the second clutch moves circumferentially of the disk, and thereafter the first clutch releases the disk and the second clutch engages and travels with it until the second clutch abuts one of said stops.

7. In a typewriter escapement a shaft mounted for rotation with the movement of the carriage, a control disk rotating with said shaft, a fixed ball clutch operating at one point upon said control disk, a second ball clutch operating upon said control disk and having a swinging movement with reference thereto, stops, one of which is adjustable, determining the extent of movement of said swinging ball clutch, and means for operating the clutches in such sequence that the fixed clutch locks the disk against movement in one direction while the second clutch moves circumferentially of the disk, and thereafter the first clutch releases the disk and the second clutch engages and travels with it until the second clutch abuts one of said stops.

8. In a typewriter escapement a shaft mounted for rotation with the movement of the carriage, a control disk rotating with said shaft, said control disk having a smooth operating area, a frictional clutch operating at one point upon the smooth operating area of said control disk, a second frictional clutch operating upon the smooth operating area of said control disk and having a swinging movement with reference thereto, stops, one of which is adjustable, determining the extent of movement of said swinging frictional clutch, and means for operating the clutches in such sequence that the fixed clutch locks the disk against movement in one direction while the second clutch moves circumferentially of the disk, and thereafter the first clutch releases the disk and the second clutch engages and travels with it until the second clutch abuts one of said stops.

9. In a control device for a power actuated movable element, a rotatable control member movable in unison with said element and having a smooth operating area, a first friction clutch fixed in position with reference to said member but operable into and out of locking position with relation to said smooth operating area to prevent said member from rotating in one direction, a second friction clutch mounted for movement circumferentially of said member and movable to and from locking position with reference to said smooth operating area, stops forming abutments for the second clutch and between which it operates, one of said stops being adjustable toward and away from the other, and means for alternately operating the clutches in such sequence that the first clutch locks the member against movement while the second clutch is released and vice versa.

10. In a control device having a power actuated movable element, a rotatable control member movable in unison with said element and having oppositely disposed smooth operating areas, a first friction clutch fixed in position with reference to said member but operable into and out of locking position with relation to said smooth operating areas to prevent said member from rotating in one direction, a second friction clutch mounted for movement circumferentially of said member and movable to and from locking position with reference to said smooth operating areas, stops forming abutments for the second clutch and between which it operates, one of said stops being adjustable toward and away from the other, and means for alternately operating the clutches in such sequence that the first clutch locks the member against movement while the second clutch is released and vice versa.

11. In a control device having a power actuated movable element, a rotatable control disk movable in unison with said element and having oppositely disposed smooth operating side areas, a first ball clutch fixed in position with reference to said member, means for moving the balls of said clutch into and out of locking position with relation to said smooth operating side areas to prevent said member from rotating in one direction, a second ball clutch mounted for movement circumferentially of said member, and means for moving the balls of said second ball clutch to and from locking position with reference to said smooth operating side areas, stops forming abutments for the second clutch and between which it operates, one of said stops being adjustable toward and away from the other, and means for alternately operating the clutches in such sequence that the first clutch locks the member against movement while the second clutch is released, and vice versa.

ROBERT THOMAS POLLOCK.
OTTO C. W. HENZE.